(12) United States Patent
Ward et al.

(10) Patent No.: US 10,160,553 B2
(45) Date of Patent: Dec. 25, 2018

(54) PUMP HEALTH MONITORING

(71) Applicant: c/o Airbus Operations Limited, Bristol (GB)

(72) Inventors: Geoff Ward, Bristol (GB); Osama Al-Tayawe, Bristol (GB); Tedja Verhulst, Bristol (GB)

(73) Assignee: Airbus Operations Limited, Bristol (GB)

( * ) Notice: Subject to any disclaimer, the term of this patent is extended or adjusted under 35 U.S.C. 154(b) by 174 days.

(21) Appl. No.: 15/246,946

(22) Filed: Aug. 25, 2016

(65) Prior Publication Data

US 2017/0057667 A1    Mar. 2, 2017

(30) Foreign Application Priority Data

Aug. 25, 2015    (GB) .................................. 1515114.5

(51) Int. Cl.
| | |
|---|---|
| *B64D 45/00* | (2006.01) |
| *B64F 5/60* | (2017.01) |
| *F04B 49/06* | (2006.01) |
| *F04B 51/00* | (2006.01) |
| *B64D 37/00* | (2006.01) |

(52) U.S. Cl.
CPC ............ *B64D 45/00* (2013.01); *B64D 37/005* (2013.01); *B64F 5/60* (2017.01); *F04B 49/065* (2013.01); *F04B 51/00* (2013.01); *B64D 2045/0085* (2013.01)

(58) Field of Classification Search
CPC ... B64D 45/00; B64D 2045/0085; B64F 5/60; F04B 49/065; F04B 51/00; G05B 2219/37252; G05B 23/0283
See application file for complete search history.

(56) References Cited

U.S. PATENT DOCUMENTS

| | | |
|---|---|---|
| 6,709,240 B1 | 3/2004 | Schmalz et al. |
| 6,757,665 B1 | 6/2004 | Unsworth et al. |
| 2004/0199362 A1 | 10/2004 | Cao et al. |
| 2004/0230384 A1 | 11/2004 | Haynes et al. |
| 2009/0249128 A1 | 10/2009 | Heckman et al. |
| 2009/0299535 A1* | 12/2009 | Delaloye ................ F01D 25/20 700/282 |

(Continued)

FOREIGN PATENT DOCUMENTS

| | | |
|---|---|---|
| EP | 1 522 731 | 4/2005 |
| EP | 1 801 391 | 6/2007 |

(Continued)

OTHER PUBLICATIONS

Extended European Search Report European patent application No. 16183430.4, dated Jan. 5, 2017 (5 pages).

(Continued)

*Primary Examiner* — Abby Y Lin
(74) *Attorney, Agent, or Firm* — Nixon & Vanderhye P.C.

(57) ABSTRACT

A pump health monitoring system for an aircraft fuel pump. The health monitoring system compares environmental data to a reference environment and captures pump data when the environmental data matches the reference environment. The pump data captured is therefore normalized to the reference environment. A pump remaining useful life is calculated from the normalized pump data.

20 Claims, 5 Drawing Sheets

(56) References Cited

U.S. PATENT DOCUMENTS

| | | | |
|---|---|---|---|
| 2013/0013138 A1 | 1/2013 | Lu et al. | |
| 2013/0197721 A1* | 8/2013 | Gu | G06Q 10/00 701/3 |
| 2014/0039833 A1 | 2/2014 | Sharpe, Jr. et al. | |
| 2016/0107763 A1* | 4/2016 | Giuliano | B64D 43/00 701/29.1 |
| 2016/0195082 A1* | 7/2016 | Wiegman | F04B 49/065 417/53 |
| 2018/0030851 A1* | 2/2018 | Emmons | F01D 17/12 |

FOREIGN PATENT DOCUMENTS

| | | |
|---|---|---|
| EP | 1 826 408 | 8/2007 |
| EP | 2 517 957 | 10/2012 |

OTHER PUBLICATIONS

Benjamin Lamoureux et al., "An Approach to the Health Monitoring of a Pumping Unit in an Aircraft Engine Fuel System", European Conference of Prognostics and Health Management Society 2012, 7 pages.

International Search Report GB 1515114.5, dated Mar. 10, 2016, 4 pages.

* cited by examiner

PUMP HEALTH MONITORING

RELATED APPLICATION

This application claims priority to Great Britain application GB 1515114.5 filed Aug. 25, 2015, and which is incorporated in its entirety.

FIELD OF THE INVENTION

The present invention relates to a pump health monitoring system for an aircraft fuel pump, and a method of monitoring fuel pump health.

BACKGROUND OF THE INVENTION

Health monitoring of components is used in predictive maintenance to assist with determining when maintenance should be performed. This provides significant cost-savings over scheduled routine maintenance which is typically based on worst case scenarios. Typically a value of 'remaining useful life', or RUL, is output as a time interval to the next appropriate maintenance requirement.

In aircraft fuel systems fuel pumps are used to feed fuel to the engines, so-called 'engine feed pumps', and to transfer fuel between fuel tanks, so-called 'transfer pumps'. Both these fuel pumps are typically electrically driven and operate as either single speed direct current (DC) or variable speed variable current devices.

Several methods utilising model-based conditioning (health) monitoring for pumps are known, e.g. U.S. Pat. No. 6,709,240, U.S. Pat. No. 6,757,665 and US 2004/0230384. These model-based health monitoring techniques generally involve analysis of the pump motor's current or electrical signature, or by detecting low flow or cavitation in the pump, and compares these to one or more models of the pump's characteristics obtained from laboratory testing. Differences between the real-world and laboratory characteristic signals can be computed to infer health status or failure mode of the motor and/or pump. The health monitoring may be performed continuously or at intervals.

A major drawback of existing model-based health monitoring techniques is that the pump may not perform in the real-world as expected from laboratory testing, making the current model-based health monitoring techniques inaccurate. This can lead to higher performance margins being applied and earlier maintenance being predicted that what is actually required which is costly, particularly in the aviation industry where the fuel pump is not only a critical part but is also difficult to access often necessitating taking the aircraft out of service to maintain, replace or repair.

SUMMARY OF THE INVENTION

A first aspect of the invention provides a pump health monitoring system for a fuel pump for pumping fuel in a fuel tank of an aircraft, comprising:

a pump sensor interface for receiving a value of one or more pump parameters relating to pump performance;

an environment sensor interface for receiving a value of one or more environmental parameters selected from the group comprising: temperature, density, pressure, volume or head of fuel in the fuel tank; flow rate of fuel through the fuel pump; aircraft attitude; aircraft acceleration in one or more dimensions; and fuel pump acceleration in one or more dimensions;

a storage device, wherein the storage device has stored therein:

a reference environment containing a predetermined reference value of one or more of the environmental parameters corresponding to an in-flight condition for the aircraft fuel pump; and a set of instructions for: comparing a value of one or more of the environmental parameters received via the environment sensor interface to the predetermined value of the same environmental parameter(s) of the reference environment; and capturing a data set of instantaneous values including the one or more pump parameters and the one or more environmental parameters, if all the received environmental parameter values and the reference environmental parameter values match within a predefined range; and a processor configured to execute the set of instructions and to store a sample pump health indicator based on the captured data set.

A further aspect of the invention provides an aircraft fuel system comprising a fuel tank having a fuel pump for pumping fuel, a pump health monitoring system according to the first aspect, at least one pump sensor coupled to the pump sensor interface for inputting a value of one or more of the pump parameters, and at least one environment sensor coupled to the environment sensor interface for inputting a value of one or more of the environmental parameters.

A further aspect of the invention provides a method of monitoring health of a fuel pump for pumping fuel in a fuel tank of an aircraft, comprising:

receiving a value of one or more pump parameters relating to pump performance;

receiving a value of one or more environmental parameters selected from the group comprising: temperature, density, pressure, volume or head of fuel in the fuel tank; flow rate of fuel through the fuel pump; aircraft attitude; aircraft acceleration in one or more dimensions; and fuel pump acceleration in one or more dimensions;

retrieving a reference environment containing a predetermined reference value of one or more of the environmental parameters corresponding to an in-flight condition for the aircraft fuel pump;

comparing a value of one or more of the environmental parameters to the predetermined value of the same environmental parameter(s) of the reference environment;

capturing a data set of instantaneous values including the one or more pump parameters and the one or more environmental parameters, if all the received environmental parameter values and the reference environmental parameter values match within a predefined range; and storing a sample pump health indicator based on the captured data set.

The inventors have found from experience that earlier than expected pump failure, or false positive pump failure indications, may be related to the pump environment which is highly transient in an aircraft. The invention is advantageous in that the data set used for the sample pump health indicator is captured only when all the received environmental parameter values and the reference environmental parameter values match within a predefined range. This ensures that the effect on the pump of its normal operating environment is normalised when the sample pump health indicator is generated, leading to improved accuracy of the pump health monitoring. Previously this normalisation was only possible by removing the pump from the aircraft and testing it periodically under controlled conditions.

The one or more pump parameters may be selected from the group comprising: input Voltage, input current, frequency of input Voltage, missing phase of input Voltage, imbalance of input Voltage, motor Voltage, frequency of motor Voltage, motor current, motor speed, motor acceleration, control error, pump internal pressure, pump internal temperature, flow rate, vibration level, or internal system status.

The storage device may further comprise one or more predetermined baseline pump health indicators. The baseline pump health indicators may be based on ideal or failure conditions, for example. The baseline pump health indicators may be obtained by out of service testing under controlled conditions, e.g. in a laboratory. The controlled conditions importantly will match the reference environment.

The baseline pump health indicators stored in the storage device may define one or more baseline pump health trends for pump health over time.

The storage device may further comprise a set of instructions for comparing the sample pump health indicator to one or more baseline pump health indicators or trends.

The comparison between the sample pump health indicator and the one or more baseline pump health indicators or trends may be made at a corresponding sample time.

The storage device may further comprise a set of instructions for correcting the sample pump health indicator to account for differences between one or more environmental parameter values of the sample pump health indicator and of the baseline pump health indicators. For example, whilst the data set for the sample pump health indicator is only captured when the environmental parameter values and the reference environmental parameter values match within a predefined range, the discrepancy between values of the environmental parameters may be corrected to further enhance the accuracy of the sample pump health indicator. The correction may utilise look up tables for example.

The storage device may further comprise a set of instructions for calculating a Remaining Useful Life, RUL, of the pump based on the comparison between the sample pump health indicator and the one or more baseline pump health indicators or trends. The RUL may be calculated as a trajectory of predicted health decay over time.

The pump health monitoring system may further comprise a user interface for presenting the pump RUL to a user.

The RUL may be compared to a threshold value and if the RUL is below the threshold value then imminent pump failure is indicated via the user interface.

In the aircraft fuel system at least part of the pump health monitoring system may be integrated with the fuel pump.

The aircraft may include a Fuel Quantity Management System (FQMS) and/or an Air Data Inertial Reference System (ADIRS), and the at least one environment sensor forms part of the FQMS or ADIRS. For example, the FQMS may provide temperature, density, pressure, volume or head of fuel in the fuel tank, or flow rate of fuel through the fuel pump. The ADIRS may provide aircraft attitude, or aircraft acceleration in one or more dimensions.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
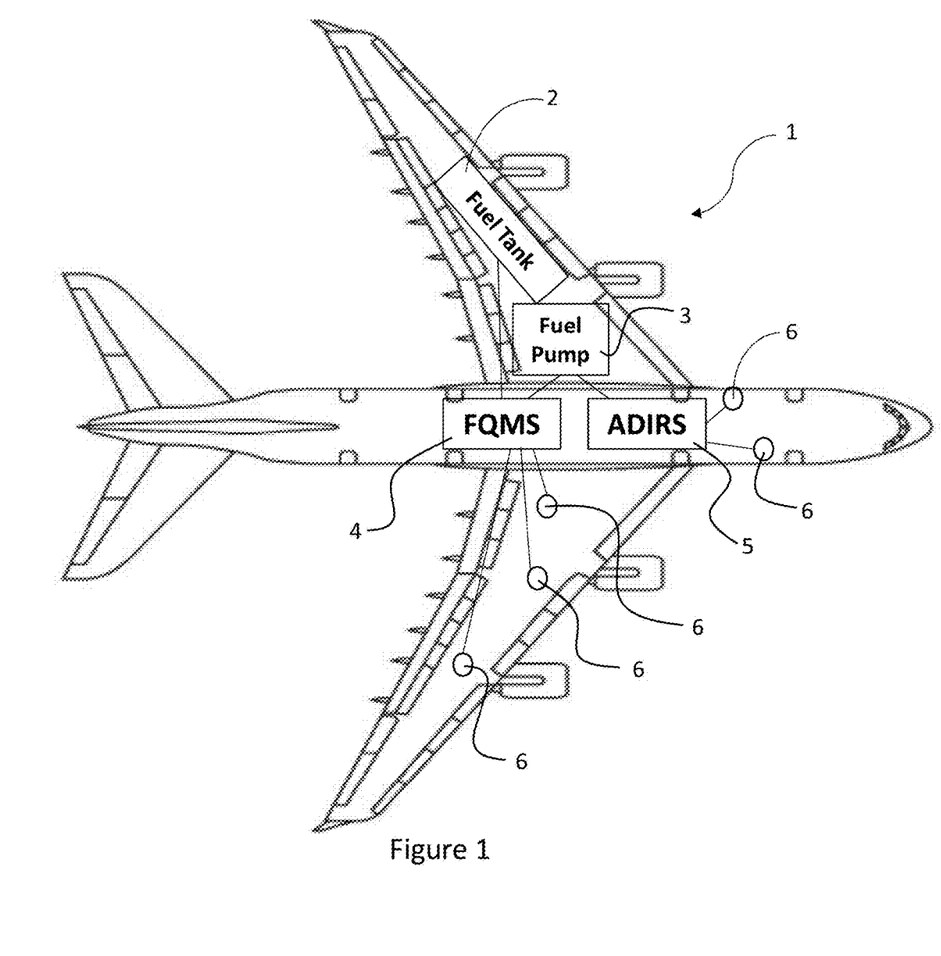
FIG. 1 illustrates schematically an aircraft having a fuel system with a fuel pump.

FIG. 1 illustrates schematically an aircraft 1 having a fuel tank 2, a fuel pump 3, a Fuel Quantity Management System (FQMS) 4, an Air Data Inertial Reference System (ADIRS) 5 and various sensors 6 connected to the FQMS 4 and the ADIRS 5.

Figure 2:
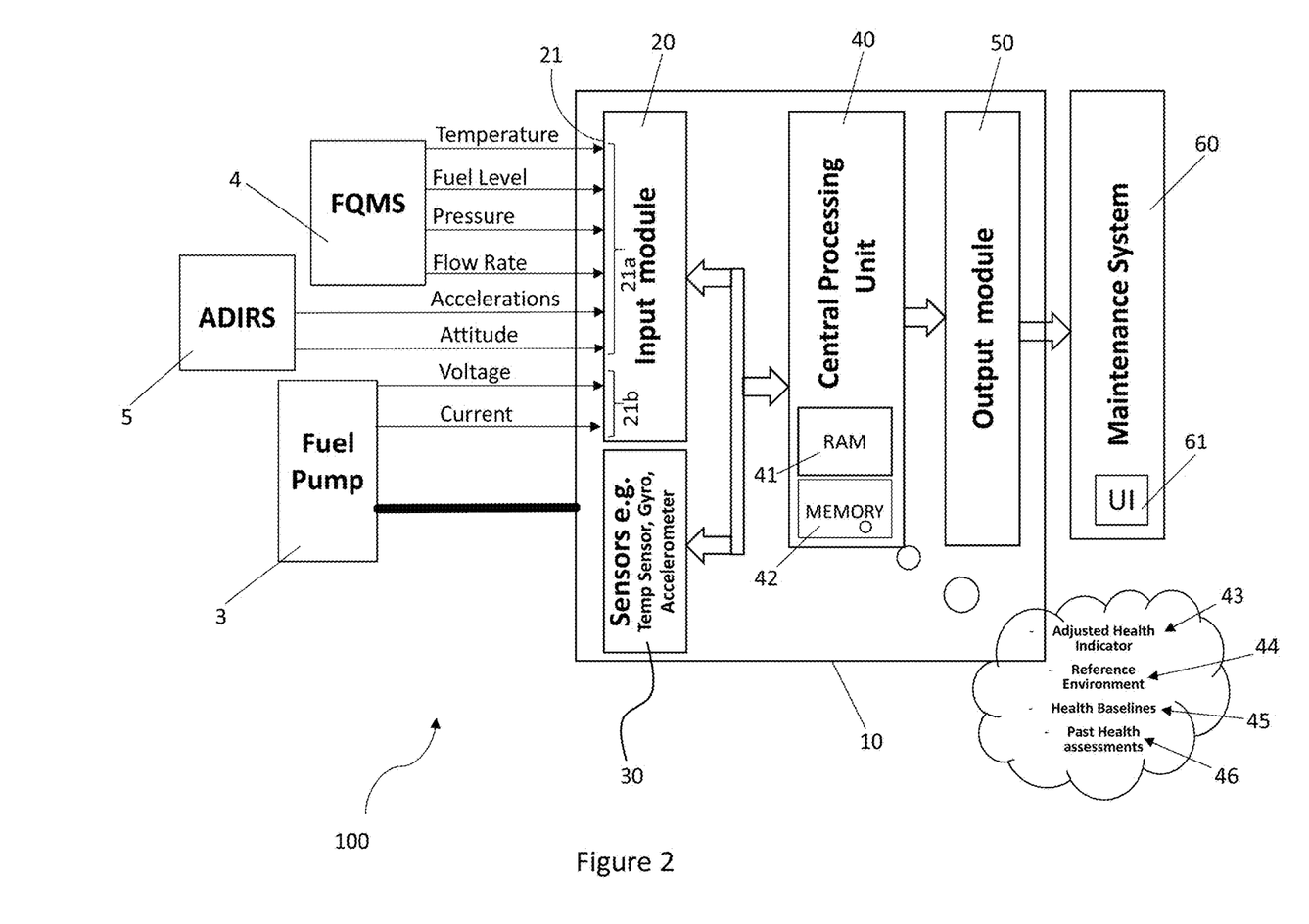
FIG. 2 illustrates a schematic diagram an aircraft fuel pump health monitoring system.

FIG. 2 illustrates a schematic diagram of an aircraft fuel pump health monitoring system 100. The health monitoring system 100 includes a pump fault prediction unit 10 having an input module 20, a sensor group 30, a central processing unit, CPU, 40 and an output module 50; a maintenance system 60; the fuel pump 3; the FQMS 4; and the ADIRS 5. It will be appreciated that the maintenance system 60; the fuel pump 3, the FQMS 4 and the ADIRS 5 form part of the health monitoring system 100 but also stand alone and form part of other systems of the aircraft 1.

The pump fault prediction unit 10 is capable of monitoring one fuel pump 3. The pump fault prediction unit 10 may be integrated within the fuel pump 3 itself but could alternatively be a self-contained unit mounted appropriately. Where not integrated with the fuel pump 3, the pump fault prediction unit 10 may provide a retro-fit solution for existing aircraft fuel pumps. Where the pump fault prediction unit 10 is integrated with the fuel pump 3 this may be used to replace an existing fuel pump 3, again as a retro-fit option. Alternatively the pump fault prediction unit 10 may form part of a new aircraft fuel system architecture. Advantageously, the FQMS 4, the ADIRS 5 and the maintenance system 60 of an existing aircraft design may be unaffected by the introduction of the pump fault prediction unit 10 to create the fuel pump health monitoring system 100.

The input module 20 has an interface 21 including an environment sensor interface 21a for receiving input of a plurality of aircraft level signals. In the illustrated embodiment these aircraft level signals include fuel temperature, fuel level, fuel pressure and fuel flow rate from the FQMS 4; and aircraft accelerations in one or more dimensions, and aircraft attitude from the ADIRS 5. In addition the 21 includes a pump sensor interface 21b which interfaces with the fuel pump 3, more particularly the controller of the fuel pump 3, to receive voltage and current signals from the pump controller. This list of inputs is not exhaustive and other aircraft level signals, pump signals, etc. may additionally or alternatively be received at the interface 21.

The sensor group 30 includes additional sensors installed to monitor the fuel pump 3 and in the illustrated embodiment the sensor group 30 includes an accelerometer, a rate sensor to measure pitch/yaw/roll, and one or more temperature sensors. The sensor group 30 measures parameters of the fuel pump 3. The input module 20 and the sensor group 30 are connected by a two way data connection to the CPU 40. The CPU includes a computing element, e.g. a processor, random access memory, RAM, 41 and non-volatile memory 42. The memory 42 is adapted to store therein various data including:

Adjusted health indicator 43
Reference environment 44
Health baselines 45
Past health assessments 46

The CPU 40 is connected to output module 50 which is adapted to interface with the aircraft maintenance system 60 having a user interface, UI, 61. The maintenance system 60 is configured to receive a value for the Remaining Useful Life, RUL, for the fuel pump 3 from the pump fault prediction unit 10.

The pump health monitoring system 100 in the illustrated embodiment receives inputs from the FQMS 4 and the ADIRS 5 and this arrangement may make use of existing sensing and monitoring equipment commonly found on existing aircraft making the installation of the pump fault prediction unit 10 relatively straightforward as a retro-fit option. However, in alternative embodiments the input module 20 may receive input of various aircraft level signals from dedicated aircraft level sensors so as to receive input of fuel temperature, fuel level, fuel pressure, fuel flow rate, aircraft accelerations, aircraft attitude, etc.

Figure 3:
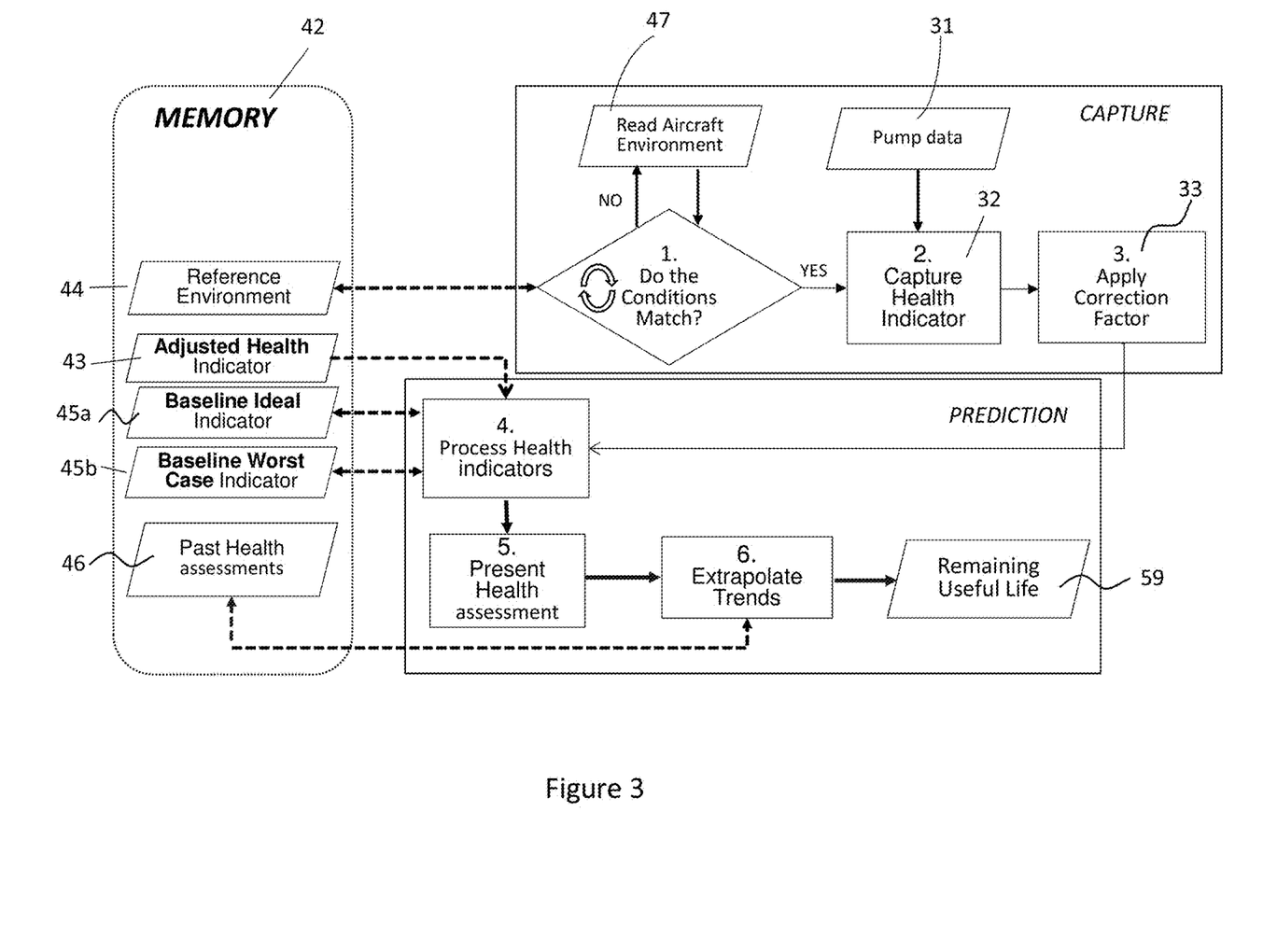
FIG. 3 illustrates a flow chart showing data capture of aircraft environment and pump life prediction.

FIG. 3 illustrates a flow chart showing data capture of aircraft environment and pump life prediction. Steps 1 to 3 in FIG. 3 refer to the health indicator capture and steps 4 to 6 relate to the RUL prediction. The set of instructions for steps 1 to 6 are stored in the memory 42 of the CPU 40 and also make use of the RAM 41 during processing of the steps.

In step 1 the aircraft environment 47 inside the fuel tank, more particularly parameters of the aircraft environment, are continuously checked. The aircraft environment 47 includes one or more environmental parameters selected from the group comprising: temperature, density, pressure, volume, or head of fuel in the fuel tank; flow rate of fuel through the fuel pump; aircraft attitude; aircraft acceleration in one or more dimensions; and fuel from acceleration in one or more dimensions. These environmental parameters are received at the environment sensor interface 21a of the input module 20, as described above with reference to FIG. 2. These environmental parameters describe the environment the fuel pump 3 is exposed to which have been determined to affect the integrity of the pump health indicator. These environmental parameters are not exhaustive and other environmental parameters may additionally or alternatively form part of the aircraft environment 47 which is evaluated.

The aircraft environment 47 is continuously checked. This continuous checking may refer to either a time based interval sampling of the aircraft environment 47 for either all or part of the time when the aircraft is switched on, or may refer to uninterrupted reading of the aircraft environment 47 from the moment the aircraft is switched on until the moment the aircraft is switched off The read aircraft environment 47 is compared at step 1 to the reference environment 44 stored in the memory 42. The reference environment 44 contains a predetermined reference value for one or more of the environmental parameters corresponding to an in-flight condition for the aircraft fuel pump 3. The reference environment is predetermined in the sense that it comprises a value of the one or more reference environment parameters determined through off-line testing under controlled conditions, e.g. from laboratory experiment, which are pre-stored in the memory 42 and are not updated during use of the pump health monitoring system 100. Whilst, of course, the parameters of the reference environment 44 may be updated and revised as necessary through a software or firmware update when the pump health monitoring system is off-line, the parameters of the reference environment 44 are not updated during normal use of the pump health monitoring system 100.

The selection of one or more of the parameters of the reference environment 44 corresponds to the same number of parameters of the aircraft environment 47 which are received via the environment sensor interface 21a. That does not mean that the environment sensor interface 21a receives only that same number of aircraft environment parameters, e.g. from the FQMS 4 and the ADIRS 5, but that the pump fault prediction unit 10 only reads the same number of aircraft environment parameters which correspond to the reference environment 44. It will be appreciated that different pump fault prediction units 10 may handle a greater or fewer number of parameters of the reference environment 44 as desired.

In step 1, once the read values of the parameters of the aircraft environment 47 are compared to the stored values of those parameters in the reference environment 44, if all of the read values of the parameters of the aircraft environment 47 do not match all of the values of the parameters of the reference environment 44 then no sample pump health indicator is captured. The parameter values in the reference environment 44 may be a single set of values but more likely are a set of parameter values each with a respective tolerance band, or the set of parameter values in the reference environment 44 may be a range of values for each parameter with upper and lower limits.

As described above with reference to FIG. 2 the pump sensor interface 21b receives the value of one or more pump parameters selected from the group comprising: voltage, current, frequency and torque of the fuel pump 3. Typically the fuel pump 3 will include an electric motor and signals from the controller of the fuel pump 3 can be used to provide the voltage, current or frequency of the electrical input to the electrical motor of the fuel pump 3. The rotating parts of the motor also can provide signals to the controller of the fuel pump 3 of the rotor torque or frequency which again may be selected as the one or more pump parameter signals received at the pump sensor interface 21b of the input module 20.

If in step 1 all of the received environmental parameter values and the reference environmental parameter values match within a pre-defined range then, at step 2, a data set of instantaneous values including the one or more pump parameters 31 and the one or more environmental parameters 47 is captured as a health indicator 32. The captured health indicator 32 includes the instantaneously read aircraft environment parameters 47 and the instantaneously captured pump data 31. The pump data 31 may additionally include parameter values from the dedicated fuel pump sensor group 30 providing parameter values of the fuel pump temperature, accelerations, etc.

Once the data set 32 has been captured at step 2 a correction factor 33 is applied at step 3. The correction factor 33 is applied to the captured data set 32 to account for any differences between the predetermined reference environment parameter values 44 and the read aircraft environment parameter values 47, bearing in mind that the read aircraft environment parameter values 47 may not match exactly with the reference environment parameter values 44 but nevertheless are within the tolerance band or range of parameter values acceptable for the condition matching at step 1.

It is to be noted that these corrections will be relatively minor where the tolerance band of the condition matching at step 1 is narrow so as to ensure accuracy of the condition matching of the reference environment and the aircraft environment but nevertheless appreciating that an exact match of a plurality of parameter values between the reference environment 44 and the read aircraft environment 47 will be difficult to achieve in practice.

The correction factor 33 applied to the captured data set 32 is based on testing of the fuel pump 3 under controlled conditions, e.g. in a laboratory environment, and may be derived from fuel pump manufacturer's data or other sources. Once the correction factor 33 has been applied to the captured health indicator 32 an adjusted health indicator 43 is stored in memory 42 and made available to the prediction mechanism to project the RUL of the fuel pump 33.

Figure 4:
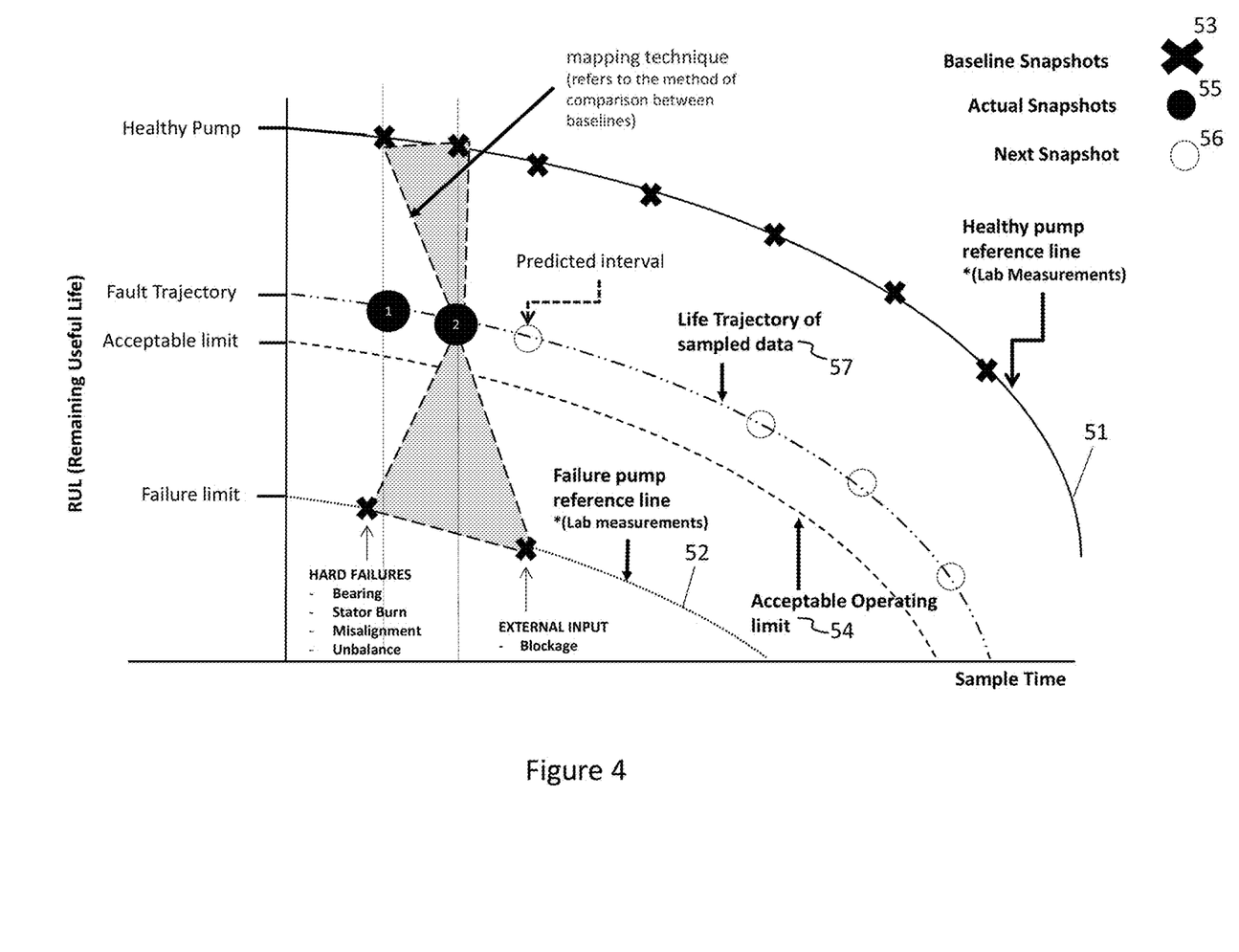
FIG. 4 illustrates a chart showing the pump RUL vs sample time degradation paths.

The prediction steps 4 to 6 for computing the RUL will now be described with reference to FIG. 4 which illustrates a chart showing the pump RUL versus sample time degradation paths. As shown in FIG. 4 the prediction mechanism uses the health indicator of an ideal and worst case pump operation, in order to create baseline pump health indicators. The ideal or "healthy pump" baseline 51 and the worst case "failure limit" baseline 52 are created from baseline snapshots 53 from laboratory tests of the fuel pump 3 under controlled conditions. The ideal baseline provides a health indicator for ideal degradation of the pump at a given sample time. The worst case baseline 52 is a health indicator when a failure or degradation exists at a sample time. The baseline pump health indicators for ideal and failure conditions, 51, 52, are stored in the memory 42. The memory 42 also stores a reference line of the acceptable operating limit 54 for the fuel pump 3.

As shown in FIG. 4 the adjusted health indicators 43 are plotted as actual snapshots 55 and form a fault trajectory on the chart of remaining useful life RUL versus sample time. In the illustrated example one previous actual snapshot 55 of an adjusted health indicator 43 is plotted and carries the number '1' whilst the current adjusted health indicator 43 is plotted as actual snapshot 55 with the number '2'.

Returning to FIG. 3, step 4 of the prediction mechanism describes the processing of the adjusted health indicator 43 by comparison with the baseline ideal indicator 45a and the baseline worst case indicator 45b. This is done by a mapping technique, which may be selected from a variety of known mapping techniques, and which is generally described in FIG. 5.

Figure 5:
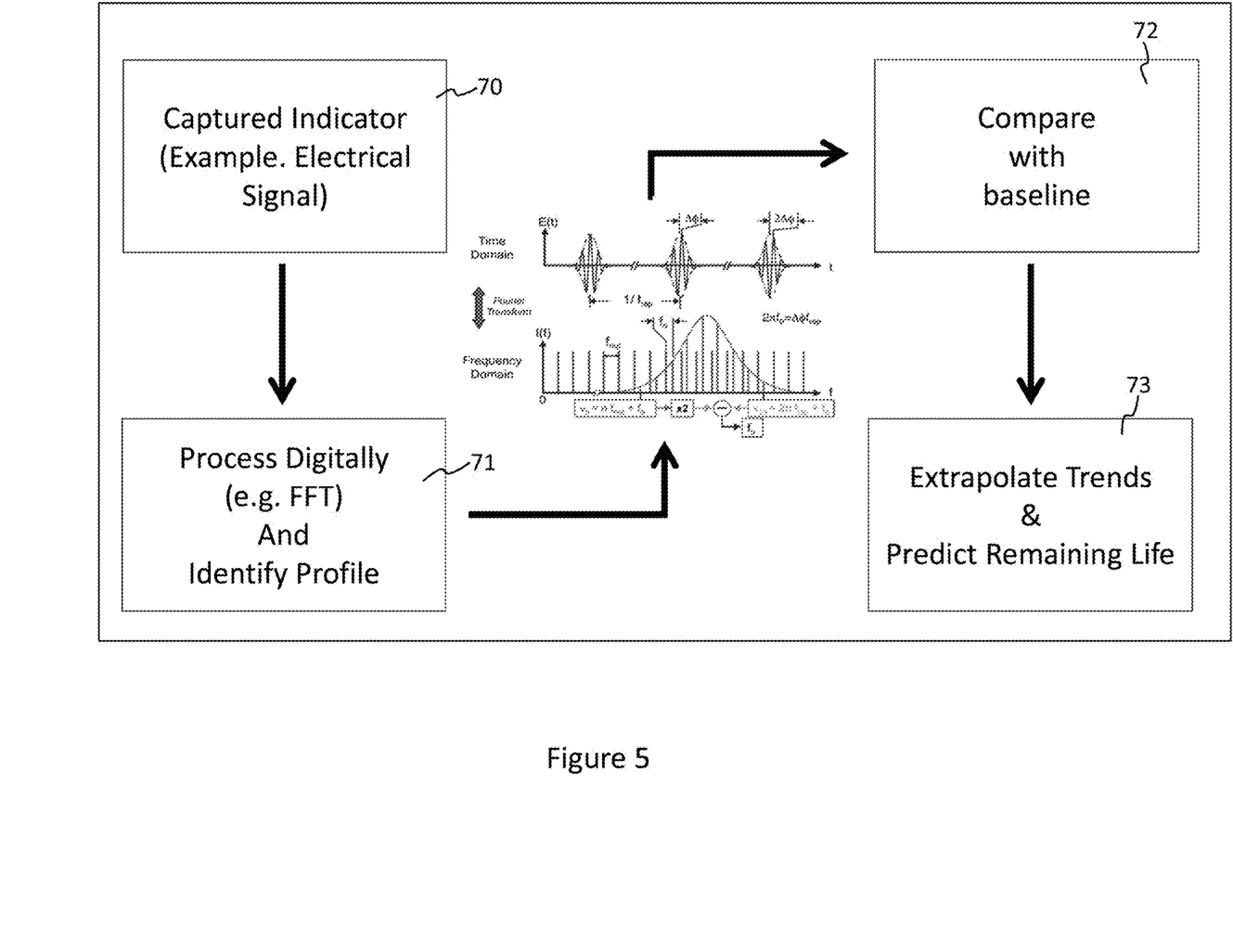
FIG. 5 illustrates a chart showing an RUL prediction mechanism.

From FIG. 5 a captured indicator 70 e.g. an electrical signal, is digitally processed, 71, e.g. by Fast Fourier Transform, and a profile identified. This profile is then compared with a baseline 72 which is used to extrapolate trends and predict remaining life, 73.

This mapping technique is illustrated graphically in the chart of FIG. 4 by the shaded triangles which show the baseline comparison 72 (the comparison with the baseline snapshots 53) in order to compute the actual snapshot 55 with the number '2', which is an assessment of the present health of the fuel pump at step 5 of the prediction mechanism.

At step 6 the present health assessment of step 5 and past health assessments 46 are used to extrapolate trends and predict next snapshots 56 which build to form a full life trajectory of sample data 57. The trajectory of health decay 57 is created based on observed trends of captured health compared with the sample time.

The evaluation of the present health is turned to a unit, the RUL 59, of the fuel pump 3.

The RUL 59 is pushed through to the output module 50 of the pump fault prediction unit 10. The pump health monitoring system 100 also includes the maintenance system 61 having user interface 61. The RUL 59 is communicated from the output module 50 of the pump fault prediction unit 10 to the maintenance system 60 which displays the RUL 59 to a user (pilot, maintenance engineer, etc.) via the user interface 61. In the event that the RUL 59 is below a threshold, imminent pump failure is indicated via interface 61.

The invention enables the creation of health assessments during flight under transient environments and attempts to find faults and create life predictions, thus generating an estimated time to failure. Operators will gain an accurate indication of when a pump should be replaced, saving money on aircraft otherwise potentially becoming grounded in a guest airport. The process uses baseline data collected under controlled conditions, which ensures high integrity for health monitoring.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A pump health monitoring system for a fuel pump for pumping fuel in a fuel tank of an aircraft, the pump health monitoring system comprising:
   a pump sensor interface configured to receive a value of one or more pump parameters relating to pump performance;
   an environment sensor interface configured to receive a value of one or more environmental parameters selected from a group comprising: temperature, density, pressure, volume or head of fuel in the fuel tank; flow rate of fuel through the fuel pump; aircraft attitude; aircraft acceleration in one or more dimensions; and fuel pump acceleration in one or more dimensions;
   a non-transitory storage device, wherein the storage device has stored therein:
      a reference environment containing a predetermined reference value of one or more of the environmental parameters corresponding to an in-flight condition for the aircraft fuel pump; and
      a set of instructions for:
         comparing the value of one or more of the environmental parameters received via the environment sensor interface to the predetermined value of the same environmental parameter(s) of the reference environment; and
         capturing a data set of instantaneous values including the one or more pump parameters and the one or more environmental parameters, if all the received environmental parameter values and the reference environmental parameter values match within a predefined range; and a processor configured to execute the set of instructions and store a sample pump health indicator based on the captured data set.

2. The pump health monitoring system according to claim 1, wherein the one or more pump parameters are selected from a group comprising: input Voltage, input current, frequency of input Voltage, missing phase of input Voltage, imbalance of input Voltage, motor Voltage, frequency of motor Voltage, motor current, motor speed, motor acceleration, control error, pump internal pressure, pump internal temperature, flow rate, vibration level, and internal system status.

3. The pump health monitoring system according to claim 1, wherein the storage device further comprises one or more predetermined baseline pump health indicators.

4. The pump health monitoring system according to claim 3, wherein the baseline pump health indicators are based on ideal or failure conditions.

5. The pump health monitoring system according to claim 4, wherein the baseline pump health indicators are obtainable by out of service testing under controlled conditions.

6. The pump health monitoring system according to claim 3, wherein the baseline pump health indicators stored in the storage device define one or more baseline pump health trends for pump health over time.

7. The pump health monitoring system according to claim 6, wherein the storage device further comprises a set of instructions for comparing the sample pump health indicator to one or more baseline pump health indicators or trends.

8. The pump health monitoring system according to claim 7, wherein the comparison between the sample pump health indicator and the one or more baseline pump health indicators or trends is made at a corresponding sample time.

9. The pump health monitoring system according to claim 7, wherein the storage device further comprises a set of instructions for correcting the sample pump health indicator to account for differences between one or more environmental parameter values of the sample pump health indicator and of the baseline pump health indicators.

10. The pump health monitoring system according to claim 7, wherein the storage device further comprises a set of instructions for calculating a Remaining Useful Life (RUL) of the pump based on the comparison between the sample pump health indicator and the one or more baseline pump health indicators or trends.

11. The pump health monitoring system according to claim 10, wherein the RUL is a trajectory of predicted health decay over time.

12. The pump health monitoring system according to claim 10, and further comprising a user interface for presenting the RUL to a user.

13. An aircraft fuel system comprising:
a fuel tank having a fuel pump for pumping fuel,
a pump health monitoring system comprising:
a pump sensor interface configured to receive a value of one or more pump parameters relating to pump performance;
an environment sensor interface configured to receive a value of one or more environmental parameters selected from a group comprising: temperature, density, pressure, volume or head of fuel in the fuel tank; flow rate of fuel through the fuel pump; aircraft attitude; aircraft acceleration in one or more dimensions; and fuel pump acceleration in one or more dimensions;
a non-transitory storage device, wherein the storage device has stored therein:
a reference environment containing a predetermined reference value of one or more of the environmental parameters corresponding to an in-flight condition for the aircraft fuel pump; and
a set of instructions for:
comparing the value of one or more of the environmental parameters received via the environment sensor interface to the predetermined value of the same environmental parameter(s) of the reference environment; and
capturing a data set of instantaneous values including the one or more pump parameters and the one or more environmental parameters, if all the received environmental parameter values and the reference environmental parameter values match within a predefined range; and
a processor configured to execute the set of instructions and store a sample pump health indicator based on the captured data set;
at least one pump sensor coupled to the pump sensor interface for inputting the value of one or more of the pump parameters, and
at least one environment sensor coupled to the environment sensor interface for inputting the value of the one or more of the environmental parameters.

14. The aircraft including the aircraft fuel system according to claim 13 wherein the aircraft includes a Fuel Quantity Management System (FQMS) or an Air Data Inertial Reference System (ADIRS), and the at least one environment sensor forms part of the FQMS or ADIRS.

15. A method of monitoring health of a fuel pump for pumping fuel in a fuel tank of an aircraft, the method comprising:
receiving a value of one or more pump parameters relating to pump performance;
receiving a value of one or more environmental parameters selected from a group comprising: temperature, density, pressure, volume or head of fuel in the fuel tank; flow rate of fuel through the fuel pump; aircraft attitude; aircraft acceleration in one or more dimensions; and fuel pump acceleration in one or more dimensions;
retrieving a reference environment containing a predetermined reference value of one or more of the environmental parameters corresponding to an in-flight condition for the aircraft fuel pump;
comparing a value of one or more of the environmental parameters to the predetermined value of the one or more of the environmental parameters of the reference environment;
capturing a data set of instantaneous values including the one or more pump parameters and the one or more environmental parameters, if all the received environmental parameter values and the reference environmental parameter values match within a predefined range; and
storing a sample pump health indicator based on the captured data set.

16. The method according to claim 15, wherein the one or more pump parameters are selected from a group comprising: input Voltage, input current, frequency of input Voltage, missing phase of input Voltage, imbalance of input Voltage, motor Voltage, frequency of motor Voltage, motor current, motor speed, motor acceleration, control error, pump internal pressure, pump internal temperature, flow rate, vibration level, and internal system status.

17. The method according to claim 15, further comprising comparing the sample pump health indicator to one or more baseline pump health indicators or baseline pump health trends for pump health over time.

18. The method according to claim 17, further comprising correcting the sample pump health indicator to account for differences between one or more environmental parameter values of the sample pump health indicator and the baseline pump health indicators.

19. The method according to claim 17, further comprising calculating a Remaining Useful Life (RUL) of the pump based on the comparison between the sample pump health indicator and the one or more baseline pump health indicators or trends.

20. The method according to claim 19, further comprising presenting the pump RUL to a user.

* * * * *

UNITED STATES PATENT AND TRADEMARK OFFICE
CERTIFICATE OF CORRECTION

PATENT NO. : 10,160,553 B2  
APPLICATION NO. : 15/246946  
DATED : December 25, 2018  
INVENTOR(S) : Geoff Ward et al.

Page 1 of 1

It is certified that error appears in the above-identified patent and that said Letters Patent is hereby corrected as shown below:

On the Title Page

Item (71), change the Applicant "c/o Airbus Operations Limited" to --Airbus Operations Limited--

Signed and Sealed this
Twenty-sixth Day of February, 2019

Andrei Iancu
*Director of the United States Patent and Trademark Office*